June 2, 1936.  W. M. ZIEGLER  2,042,648
FLOATING TOOL HOLDER
Filed Sept. 21, 1934

INVENTOR
William M. Ziegler.
BY
Stanley Lightfoot.
ATTORNEY

Patented June 2, 1936

2,042,648

UNITED STATES PATENT OFFICE 2,042,648

FLOATING TOOL HOLDER

William M. Ziegler, Detroit, Mich.

Application September 21, 1934, Serial No. 744,945

2 Claims. (Cl. 279—16)

This invention relates to tool holders of the floating type wherein provision is made for lateral play of the socket member with respect to the shank or body of the said holder to admit of the self-centering of a tool in use, or the self-aligning of the tool with the work in a manner well known in the art.

The invention provides for an arrangement of parts in such a tool holder which will meet the requirements of such a device in a very complete and efficient manner, with marked freedom from any tendency to tilt or bind, on the part of the socket member, such as has been found to occur with similar devices hitherto used; and it is proposed to provide in the device a floating plate through which the socket member is driven with driving means so arranged that although full lateral play is given the said socket member, through the medium of the said plate, the driving forces are transmitted from one element to the other in true tangential direction with freedom from pressures exerted at undesirable angles thereto.

A further object is to relieve the bearing elements of the assembly from any of the driving forces, thereby minimizing wear in the device and tendency to resist floating of the spindle. An assembly is provided utilizing the operating forces to the greatest advantage for securing both strength and free movement of the floating parts with straight line rigidity.

Still further objects or advantages subsidiary to or resulting from the aforesaid objects, or from the construction or operation of the invention as it may be carried into effect, will become apparent as the said invention is hereinafter further disclosed.

In carrying the invention into effect, I may provide the shank of the tool holder with a pair of roller-carrying pins projecting from the outer face thereof, the rollers engaging in radial slots in a floating plate contiguous to said face, and a floating tubular socket member having a shoulder extending over the outer face of the said plate and provided with similar roller-carrying pins, the rollers of which engage further radial slots in the said plate, the slots of this plate being so arranged that the said plate is laterally movable in one direction over the face of the shank whereas the shoulder of the socket is laterally movable over the face of the plate in a lateral direction at right angles to the first mentioned movement. This combination of movements permits the socket to move laterally in any direction relative to the shank of the tool holder. This shoulder is so spaced from the face of the said shank, by thrust balls situated in passages through the said plate, that the said shoulder does not engage the face of the plate which is, therefore, freed from any pressures other than the tangential forces exerted by or against the said rollers. Similarly, the said balls are relieved from any driving forces. The members referred to are held in assembled relation by an enclosing housing which also encloses an outer thrust bearing for the shoulder of the floating socket. All of which is more particularly described and ascertained, by way of example, in and by the following description of the device shown in the accompanying drawing, wherein:

Similar characters of reference indicate similar parts in the several figures of the drawing.

Figure 1:
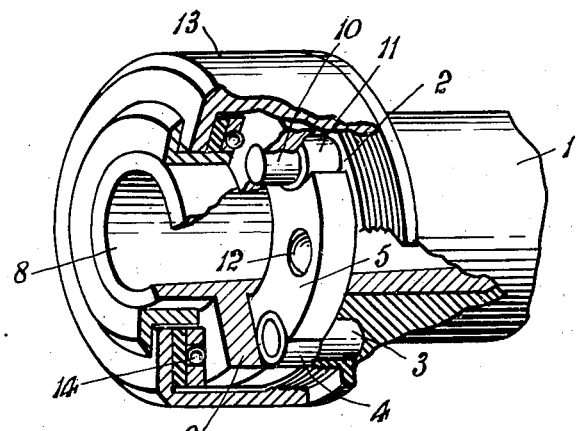
Figure 1 is a broken perspective view of a floating tool holder embodying the said invention.
Figure 2:
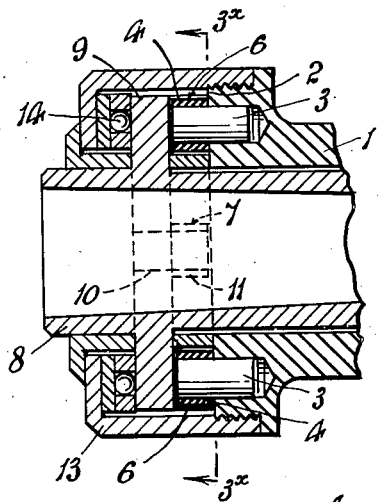
Figure 2 is a longitudinal section of the same.

1 is the usual tubular shank terminating in the face 2 from which pins 3 project forwardly, these pins having rollers 4 mounted thereon. 5 is a floating plate or ring provided with radial slots 6 and 7, the rollers 4 entering the slots 6 whereby the said plate may move laterally, in the direction of the said slots 6, over the face of the said shank.

8 is a floating socket (suitably formed for the reception of a tool) this socket being provided with an annular shoulder 9 the rear face of which extends over the said floating plate 5. Carried by and projecting rearwardly of the said shoulder 9 are pins 10 carrying rollers 11 which engage in the slots 7 of the plate. The floating socket not being otherwise prevented is, therefore, capable of movement over the plate laterally in the direction of the slots 7 and also laterally, with the plate, in the direction of the slots 6, the combination of these movements permitting the floating of the socket in any lateral direction which may be called for in use.

That this movement of the socket may not occasion friction or wear on the plate, and to prevent pressure of work being transmitted to the plate and hampering its operation, I provide the said plate with a series of passages therein in which are located balls 12, of greater diameter than the thickness of the said plate, so that these balls will directly space the shoulder of the socket from the face of the shank, taking all thrust at that point and acting as bearings on which the said shoulder moves.

A retaining cover or sleeve 13 threads on to the end of the shank to enclose the described members, and this cover also positions an outer thrust bearing 14 against the outer face of the shoulder 9 of the socket 8. A dust cap, laterally movable with the socket protectively extends over the face of the cover 13.

Figure 4:
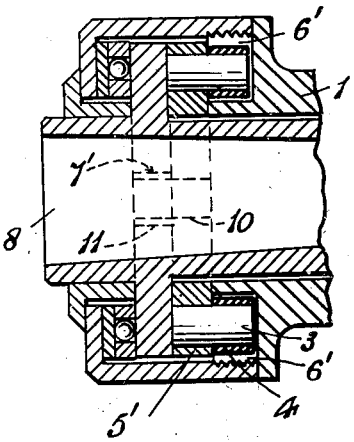
Figure 4 is a similar view to Figure 2, showing a slightly modified arrangement of the parts.
Figure 3:
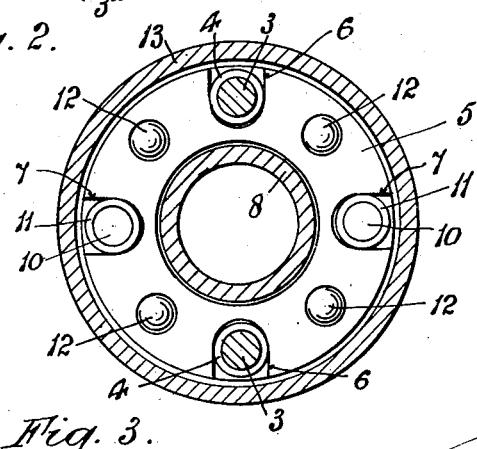
Figure 3 is a transverse section taken on the line 3x—3x, Figure 2.

It will be apparent that the arrangement described admits of changes or the introduction of mechanical equivalents to produce similar results, although not necessarily with the same degree of efficiency for all purposes, and an example of such a change is illustrated in Figure 4, wherein the floating plate 5' carries the pins 3 and 10. The rollers 4 and 11 on these pins enter radial guide slots 6' and 7' respectively located in the end of the shank 1 and in the shoulder of the floating socket 8.

This invention may be developed within the scope of the following claims without departing from the essential features of the said invention, and it is desired that the specification and drawing be read as being merely illustrative and not in a limiting sense, except as necessitated by the prior art.

What I claim is:

1. A floating tool holder comprising a shank, a tool socket having an external annular flange, a centrally apertured plate surrounding said tool socket between the outer end of said shank and said annular flange of said tool socket, said plate and said tool socket being movable laterally relative to each other and relative to said shank, pin and slot means for guiding said socket for lateral movement relative to said plate and said shank in one direction, further pin and slot means for guiding said socket and said plate for lateral movement relative to said shank in a direction at right angles to said first-named direction, and anti-friction means for spacing said shank and said flange so as to ensure free movement of said plate and said tool socket laterally relative to each other and relative to said shank.

2. A floating tool holder comprising a shank, a tool socket having an external annular flange, a centrally apertured plate surrounding said tool socket between the outer end of said shank and said annular flange of said tool socket, said plate and said tool socket being movable laterally relative to each other and relative to said shank, pin and slot means for guiding said socket for lateral movement relative to said plate and said shank in one direction, further pin and slot means for guiding said socket and said plate for lateral movement relative to said shank in a direction at right angles to said first-named direction, and a series of anti-friction means carried by and arranged around the axis of said plate spacing said shank and said flange from said plate and in true parallel relation to one another so as to ensure free movement of said plate and said tool socket laterally relative to each other and relative to said shank, a cover carried by said shank and enclosing said plate and said annular flange, the outer end of said cover extending inwardly in front of said annular flange, a thrust bearing between said outer end of the cover and said annular flange, and a dust cap movable laterally with the tool socket and having slidable overlapping relation with said outer end of the cover.

WILLIAM M. ZIEGLER.